Nov. 17, 1936.  A. W. LINDHOLM ET AL  2,061,241
CLOSURE APPLYING MECHANISM
Filed Nov. 23, 1933
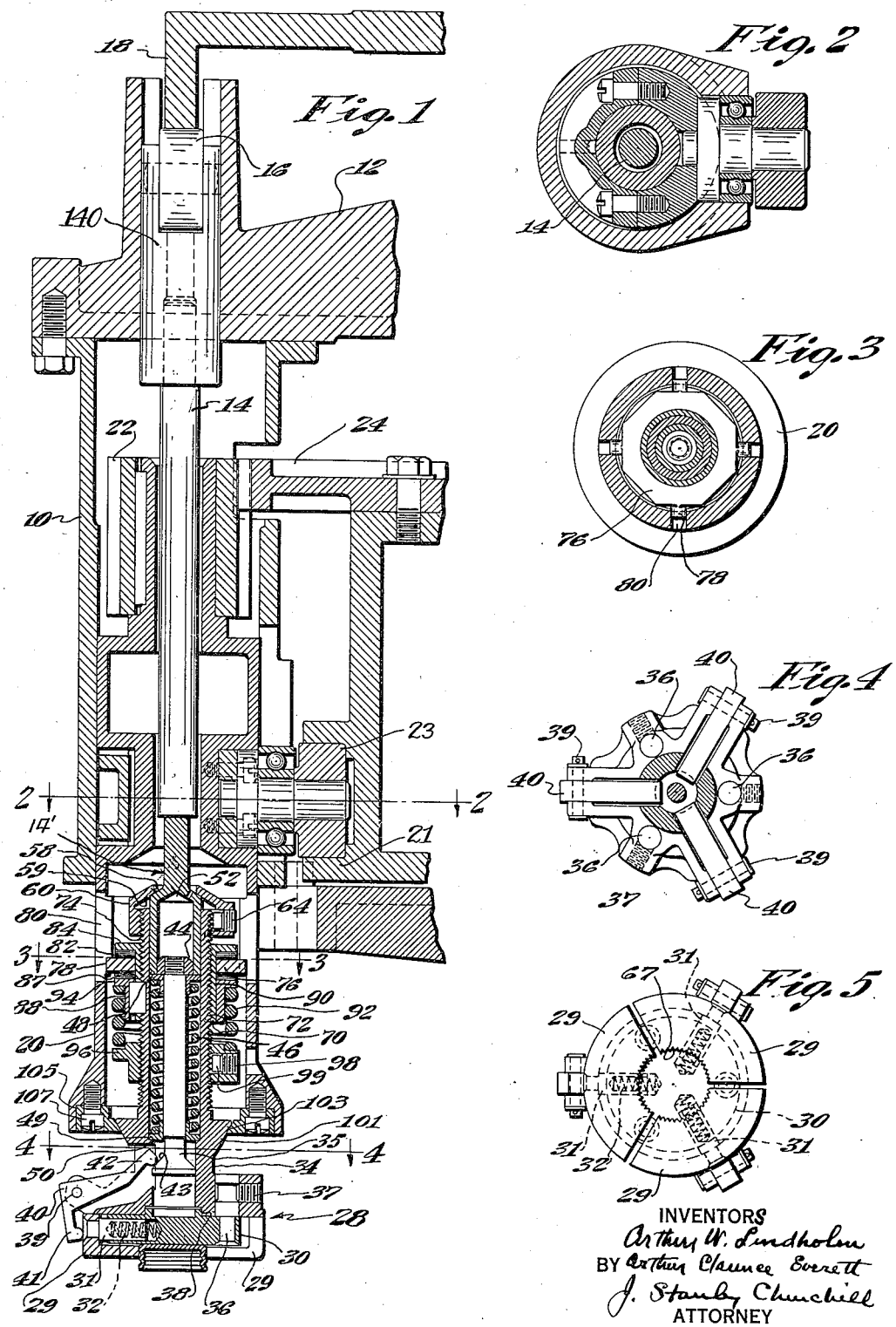
INVENTORS
Arthur W. Lindholm
BY Arthur Clarence Everett
J. Stanley Churchill
ATTORNEY Patented Nov. 17, 1936

2,061,241

UNITED STATES PATENT OFFICE 2,061,241

CLOSURE APPLYING MECHANISM

Arthur W. Lindholm, East Milton, and Arthur Clarence Everett, Boston, Mass., assignors to Pneumatic Scale Corporation, Limited, Quincy, Mass., a corporation of Massachusetts Application November 23, 1933, Serial No. 699,394

6 Claims. (Cl. 226—88)

This invention relates to closure applying mechanism, and more particularly to a closure applying chuck assembly.

The invention has for an object to provide a novel and improved closure applying chuck assembly which is particularly useful in the application of screw closures to containers such as bottles and embodying certain novel features, as will be pointed out, by which bottle breakage is reduced to a minimum and the closures may be applied to the containers in a positive, rapid and efficient manner.

With this general object in view and such others as may hereinafter appear, the invention consists in the closure applying mechanism and more particularly in the closure applying chuck assembly hereinafter described and particularly defined in the claims at the end of this specification.

In the drawing illustrating the preferred embodiment of the invention, Fig. 1 is a vertical sectional view illustrating the preferred form of chuck assembly; Figs. 2, 3 and 4 are sectional details taken on the lines 2—2, 3—3 and 4—4, respectively, of Fig. 1; and Fig. 5 is a bottom view of the closure holding member comprising a part of the chuck shown in Fig. 1.

In general, the present invention contemplates a novel closure applying chuck assembly particularly adapted to grip and hold a screw closure and to apply the same to the threaded neck of a container such as a bottle in a positive, efficient manner such as to minimize the breakage of the mouth of the container or bottle and the improved chuck assembly finds particular utility in connection with automatic closure applying machines in which it is preferably embodied.

Referring now to the drawing, which as above stated illustrates the preferred form of the invention as embodied in a machine for applying screw closures to containers such as bottles, only a sufficient portion of the machine is herein illustrated to enable the invention to be understood. The construction and mode of operation of the closure applying machine may comprise that disclosed in the United States patent to Pennock, No. 1,651,902, dated December 6, 1927, to which reference may be made, and it is believed to be sufficient to state that in the operation of such a closure applying machine the containers such as the bottles are conveyed into closure applying position by suitable conveying mechanism, and provision is made for automatically feeding the closures into a position to be operatively engaged by the chuck. Provision is made for relatively moving the chuck and bottle or other container to bring the closure into engagement with the threaded neck of the bottle, and thereafter for rotating the chuck to effect the application of the screw closure to the container.

As herein shown, the present closure applying mechanism comprises a tubular supporting member 10 secured to a rotatable spider member 12 within which a chuck actuating member indicated generally at 140 is supported to be capable of vertical movement. The chuck carrying member also includes an operating rod or member 14. The upper end of the member 140 is provided with a cam roll 16 which cooperates with a stationary cam 18 during the rotation of the spider 12 to effect downward movement of the member 14 for the purposes of opening the jaws of the chuck, as will be described. The chuck actuating member 14 is at its lower end enclosed within an outer housing 20 which is elongated and at its upper end has secured to it a wide-toothed pinion 22 arranged to mesh with a stationary ring gear 24 to effect rotation of the housing 20 on its own axis during the revolution of the spider 12 during the operation of the machine. The chuck actuating member 14 at its lower end is supported on a chuck carrier indicated at 14' which carries a chuck indicated generally at 28, and provision is made for frictionally connecting the rotatable outer housing 20 and the chuck carrier 14' to enable the chuck 28 to screw a closure onto the container or bottle while permitting slipping between the two when the closure has been completely screwed onto the container. The housing 20 and associated parts are raised and lowered by a stationary cam 21 and a cooperating cam roll 23.

As herein shown, the chuck indicated generally at 28 includes a closure gripping mechanism comprising a plurality of jaws 29 mounted to slide radially in a disk 30, and each jaw is provided with a pin 31 having a drilled-out portion in one end and having the other end riveted to the jaw, as shown. The pin 31 is slidably fitted in a hole bored radially in the disk 30, and a spring 32 is provided in each hole normally tending to keep the jaws in an open position. One end of the spring bears in the bottom of the hole in the disk. The disk is attached to the bottom of a spindle 34 by means of pins 36, one end of the pins being rigidly fastened to the disk and the other end projecting upwardly therefrom and through holes in the spindle and are held in position by set screws 37, as shown. A circular shoulder 38 is provided on the disk which fits snugly in a recess bored in the bottom of the spindle 34 and serves to centralize the disk on the end of the spindle. With this arrangement the jaws are detachable as a unit with the supporting disk and are consequently made readily changeable for varying diameters of caps or closures and the whole assembly may be removed by merely loosening the set screws 37 and removing the disk 30 with the jaws 29 thereon and then replacing the same with a new assembly.

A plurality of clutch fingers 40 are pivotally mounted on the lower enlarged portion of the spindle 34 by means of pins 39, as best shown in Fig. 1. The lower arm 41 of each clutch finger 40 bears against the outside of one of the jaws 29 and the other arm 42 bears on a conical surface 43 of the spindle 35. The upward movement of the spindle 35 operates to move the jaws 29 inwardly to grip and hold the closure or cap, while the downward movement of the spindle 35 allows the springs 32 to open the jaws 29. The upper end of the spindle 35 is threaded and provided with a nut 44 for holding a spring 46 under compression. A spring collar 48 is provided between the nut 44 and the top of the spring 46 to centralize the spring and act as a washer for the nut 44. A similar collar 49 is provided at the lower end and rests upon a shoulder 50 on the spindle 34, so that the spring 46 normally has a tendency to raise the spindle 35. The height to which the spindle 35 can be raised is determined by a spindle provided with a hole 52 in which the nut 44 and spindle 35 may be free to move up and down. The spring 46 serves to maintain chuck carrier 14' in engagement with actuating rod 14 and to hold the cam roll 16 against its cam 18.

A tapered shoulder portion 58 is provided against which the flange 59 of a threaded collar 60 bears and the latter is screwed onto the threads 74 of the spindle 34. A set screw 64 is provided to hold the collar 60 in the desired position of adjustment. The adjustment of the collar 60 determines the vertical position of the spindle 35 and particularly the conical surface 43 and hence limits the inward position of the chuck jaws 29. It will therefore be observed that if for any reason a closure or cap is not fed to the capping chuck, the serrated teeth 67 of the jaws 29 would, unless prevented by the mechanism described, close up to such a small diameter as to break particles of glass from the bottle top or to break the bottle itself, thus scattering broken glass and the contents of the bottle throughout the machine and interfering with the operation thereof.

The cap gripping portion of the chuck is driven through an adjustable friction device capable of being adjusted to slip when the cap has been screwed on the bottle with any desired degree of tightness and comprises a flanged nut 70 having threads 72 which cooperate with threads 74 on the spindle 34 to hold it in proper position. A collar 76 having pins 78 fastened therein projecting into elongated slots 80 in the chuck housing 20 forms the positive driving element of the friction drive for the chuck. The pins 78 are free to slide vertically in the elongated slots 80 but cause the collar 76 to be rotated with the chuck housing 20. A friction washer 82 made of fibrous frictional material is provided between the collar 76 and the flange 84 of the flanged nut 70. A similar friction washer 87 is provided between the collar 76 and a flanged collar 88. The flanged collar 88 together with the friction washers 82, 87 and collar 76 are slidably mounted on the hub 90 of the flanged collar 70. A compression spring 92, one end of which encircles the flanged collar 88, bears against the flange 94 and the other end of the spring is supported by an adjustable nut 96 screwed onto the threaded portion 74 of the spindle 34. A set screw 98 is provided to lock a plug 99 in position when adjustment is made to give the proper friction between the frictional washers 82, 87 and the collar 76. It will thus be seen that by adjusting the nut 96, the caps may be screwed on the bottle with any desired degree of tightness.

During the operation of the machine when the top of a bottle comes in contact with a cap held in the jaws of the chuck, provision is made for permitting the gripping mechanism to move vertically in the chuck housing 20 so that this portion of the chuck will have a universal floating centralizing action to more readily apply the cap to the bottle, particularly where there is any irregularity either in the cap or in the bottle, which would otherwise tend to throw the center of the cap out of line with the center of the neck of the bottle. This is accomplished by providing a conical surface 101 on the spindle 34 normally supported by a corresponding conical surface 103 on a collar 105 fastened to the bottom of the chuck housing 20 by the screws 107, as shown in Fig. 1.

The operation of the mechanism will it is thought be clearly understood from the foregoing description, together with reference to the Pennock patent above referred to, and it is believed sufficient to state that the chuck jaws 29 are during the operation of the machine opened by the depression of the chuck actuating member 140 under the influence of the stationary cam 18 during the rotation of the spider 12 to bring the capping head into cap receiving position. The downward movement of the chuck actuating member 140 and rod 14 depresses the conical cam surface 43 of the spindle 35, thus permitting the springs 32 to effect the opening of the jaws 29. When the capping head reaches cap receiving position, the chuck actuating member 14 is raised, causing the jaws 29 to grip and hold the cap or closure.

While the preferred embodiment of the present invention has been herein illustrated and described, it will be understood that the invention may be embodied in other forms within the scope of the following claims.

Having thus described the invention, what is claimed is:—

1. Closure applying mechanism for the application of screw closures to containers comprising a rotatable outer housing, a chuck carrying member supported within the housing to be capable of vertical movement with relation to the housing and of rotary movement with the housing, and a friction connection between the chuck carrying member and the outer housing for effecting rotation of the two together, said chuck carrying member having a chuck mounted on the lower end thereof.

2. Closure applying mechanism for the application of screw closures to containers comprising a rotatable outer housing provided with a slot, a chuck carrying member within the housing, friction connections between the chuck carrying member and the housing including a pin and a slot in the outer housing, said pin sliding in the slot in the outer housing whereby rotary movement is imparted to the chuck carrying member from the housing through the walls of the slot and through said pin, said chuck carrying member being provided upon its lower end with a chuck and being capable of vertical movement.

3. Closure applying mechanism for the application of screw closures to containers comprising a rotatable outer housing, a chuck carrying member mounted within the housing, a friction connection between the outer housing and the chuck carrying member, whereby to effect rotation of both together and having provision for permitting vertical movement of the chuck carrying member with relation to the housing, a chuck provided with a movable jaw mounted upon the lower end of the chuck carrying member, and mechanism actuated by vertical movement of the chuck carrying member for operating said jaw.

4. Closure applying mechanism for the application of screw closures to containers comprising a supporting member, a chuck carrying member mounted to be capable of movement therein and provided with a plurality of movable chuck jaws for engaging and clamping the closure to be applied, spring means for urging the jaws inwardly, and means for adjustably limiting the inward movement of the jaws.

5. Closure applying mechanism for the application of screw closures to containers comprising a supporting member, a chuck carrying member mounted to be capable of movement therein and provided with a plurality of movable chuck jaws for engaging and clamping the closure to be applied, spring means for urging the jaws inwardly, and means carried by said chuck carrying member for adjustably limiting the inward movement of said jaws.

6. In a machine for applying screw caps to containers, a rotary chuck having clamping jaws movably mounted therein to be capable of movement into and out of engagement with a closure, spring means for urging the jaws inwardly, and adjustable means for limiting the inward movement of the clamping jaws to a diameter greater than the diameter of the mouth of the container to which the closure is to be applied.

ARTHUR W. LINDHOLM.
ARTHUR CLARENCE EVERETT.